US007034249B2

(12) United States Patent
Gustafsson et al.

(10) Patent No.: US 7,034,249 B2
(45) Date of Patent: Apr. 25, 2006

(54) METHOD OF CONTROLLING THE WELDING OF A THREE-DIMENSIONAL STRUCTURE

(75) Inventors: Jukka Gustafsson, Mynämäki (FI); Mikko Veikkolainen, Espoo (FI)

(73) Assignee: Kvaerner Masa-Yards Oy, Helsinki (FI)

( * ) Notice: Subject to any disclaimer, the term of this patent is extended or adjusted under 35 U.S.C. 154(b) by 10 days.

(21) Appl. No.: 10/866,335

(22) Filed: Jun. 10, 2004

(65) Prior Publication Data

US 2005/0021170 A1 Jan. 27, 2005

(30) Foreign Application Priority Data

Jun. 12, 2003 (FI) ................................ 20030883

(51) Int. Cl.
*B23K 9/127* (2006.01)

(52) U.S. Cl. ............................ 219/124.34; 219/125.1; 901/42

(58) Field of Classification Search ........... 219/124.34, 219/125.1; 901/42
See application file for complete search history.

(56) References Cited

U.S. PATENT DOCUMENTS

| | | | | |
|---|---|---|---|---|
| 3,708,100 A | | 1/1973 | Buchfuhrer et al. | |
| 4,697,239 A | * | 9/1987 | Sicard et al. | 700/113 |
| 4,827,099 A | | 5/1989 | Krebs et al. | |
| 5,275,327 A | | 1/1994 | Watkins et al. | |
| 5,572,102 A | | 11/1996 | Goodfellow et al. | |
| 5,999,642 A | | 12/1999 | Gilliland | |
| 6,088,106 A | | 7/2000 | Röckseisen | |
| 6,226,395 B1 | | 5/2001 | Gilliland | |
| 6,750,426 B1 | * | 6/2004 | Veikkolainen et al. | 219/124.34 |

FOREIGN PATENT DOCUMENTS

| | | |
|---|---|---|
| EP | 0 520 894 | 12/1992 |
| EP | 1 188 510 | 3/2002 |
| FI | 73615 | 2/1983 |
| FI | 955274 | 11/1995 |
| FI | 971044 | 3/1997 |
| FI | 101689 | 8/1998 |
| FI | 20001907 | 8/2000 |
| JP | 09-155579 A * | 6/1997 |
| WO | 03/042924 | 5/2003 |

OTHER PUBLICATIONS

Patent Abstracts of Japan, Publication No. 09155579, published Jun. 1997.

* cited by examiner

*Primary Examiner*—Clifford C. Shaw
(74) *Attorney, Agent, or Firm*—Smith-Hill and Bedell

(57) ABSTRACT

A welded structure is formed by arranging multiple pieces on a three-dimensional support base to provide an assembly in accordance with the structure to be welded and making a picture map of the assembly by photographing the assembly. Weld points are identified from the picture map and welding parameters are determined from the picture map. Control data specifying the weld points and welding parameters are supplied to welding equipment that is operable in a three-dimensional X-Y-Z coordinate system. The welding equipment is moved in the X-Y plane on the basis of the picture map and said control data. The welding equipment is moved along the Z-axis on the basis of Z-axis position data that are acquired by repeatedly measuring the Z-axis position of the support base.

15 Claims, 2 Drawing Sheets

METHOD OF CONTROLLING THE WELDING OF A THREE-DIMENSIONAL STRUCTURE

CROSS REFERENCE TO RELATED APPLICATION

This application claims priority under 35 USC 119 of Finnish Patent Application No. 20030883 filed Jun. 12, 2003.

BACKGROUND OF THE INVENTION

This invention relates to a method of controlling the welding in a three-dimensional X-Y-Z coordinate system.

Especially in shipbuilding robotized welding of shaped pieces has not been possible in practical production on one hand due to programming problems and on the other hand due to the accuracy of manufacture. In practice, the dimensional accuracy of the piece and its positioning accuracy have not reached a sufficiently high level that the robotizing could be based for instance on information obtained from the design system. Efforts have been made to solve the problems by specifying the manufacture of components and the positioning accuracy and by developing programming systems based e.g. on simulation. Then, however, serious problems have been encountered both in the technical realization and in expense.

U.S. patent application Ser. No. 09/941,485 (now U.S. Pat. No. 6,750,426) discloses a method of flat welding pieces by utilizing a welding robot and an artificial vision system. Thus, the structure to be welded, which is arranged on a support surface, is first photographed and then on the basis of the produced picture map the points to be welded are identified and the corresponding welding parameters are determined, and the welding parameters are passed to the welding machine so as to control the welding. Programmable macro programs may be utilized in the welding. This method is advantageous in itself, but it is not as such applicable to the welding of three-dimensional curved pieces.

U.S. Pat. No. 5,999,642 discloses a method and an arrangement for photographing a three-dimensional structure for welding. The structure is photographed by scanning it with a sufficient number of cameras and/or from several angles so as to fully define the structure to be welded and subsequently the structural information is passed to a welding program, which controls a welding robot. Complete visual information on the whole three-dimensional structure is produced and by means of that information the operation of the welding robot is controlled in the real world. A mathematical model of the structure to be welded is produced. The method is laborious and its image processing is complicated, and therefore the method is quite time-consuming. Inaccuracies related to the practical welding process cannot be avoided by using this method.

SUMMARY OF THE INVENTION

An aim of the present invention is to provide a novel method, as simple and as easily feasible as possible, of welding a three-dimensional structure by using a welding robot or the like, where the disadvantages related to the known method have been eliminated.

According to the invention the welding is accomplished so that the control of the welding equipment in an X-Y plane is based on a picture map and the control data determined on the basis of the picture map. The level or height of the surface to be welded in the direction of a Z-axis, i.e. the vertical axis, of the coordinate system is measured continuously and the level information is passed to the control system of the welding equipment so as to control the welding equipment in real time in the direction of the Z-axis also. According to the invention it is sufficient to obtain two-dimensional visual information regarding the shaped pieces in order to provide a basis for the control of the welding equipment, i.e. a welding robot or a manipulator, and the visual information is supplemented by real-time vertical measuring and adjustment. Thus, the curved surfaces of the structure to be welded may be projected into a plane for the welding robot and no complicated photographing of the three-dimensional structure is needed in advance.

Laser pointing directed at the surface to be welded is preferably used for measuring the level, whereby the laser pointing is monitored in real time by a camera device, which provides information on the basis of which the current level of the surface to be welded is determined. Preferably, three laser pointers are used for the laser pointing, which pointers are directed so that they intersect and the points of incidence of the beams on the surface to be welded provide three measuring points that are spaced from each other. The three measuring points are photographed by a camera device and based on the acquired visual information the current level relative to the laser pointers of the surface to be welded is determined by calculation on the basis of the mutual distances between the measuring points. The control data for the Z-axis are preferably calculated over a longer distance in order to avoid incorrect information produced by the intersecting structures possibly existing in the object to be welded.

For measuring the level of the surface to be welded the camera device is preferably attached to the same carriage with a robot and the welding equipment. The control itself in the direction of the Z-axis may be performed independently, whereby it operates in parallel with the control of the welding robot, or it may be integrated with the control of the robot.

The level value is passed to the control system of the welding equipment, which system is arranged to keep the welding equipment at a constant distance from the surface to be welded. In addition, the control of the welding equipment may be assisted by weld groove monitoring for instance through the welding arc, or by optical weld groove monitoring, for correcting small errors in the positioning of the welding equipment.

Lighting fixtures provided with a dimmer are preferably used for equalizing the lighting conditions. Thus, the effect of changes in the lighting conditions on establishing the picture map may be eliminated as efficiently as possible.

The method is especially applicable to robotized welding of shaped pieces in watercraft.

BRIEF DESCRIPTION OF THE DRAWINGS

In the following the invention is described by way of example with reference to the attached drawings, in which.

DETAILED DESCRIPTION

Figure 1:
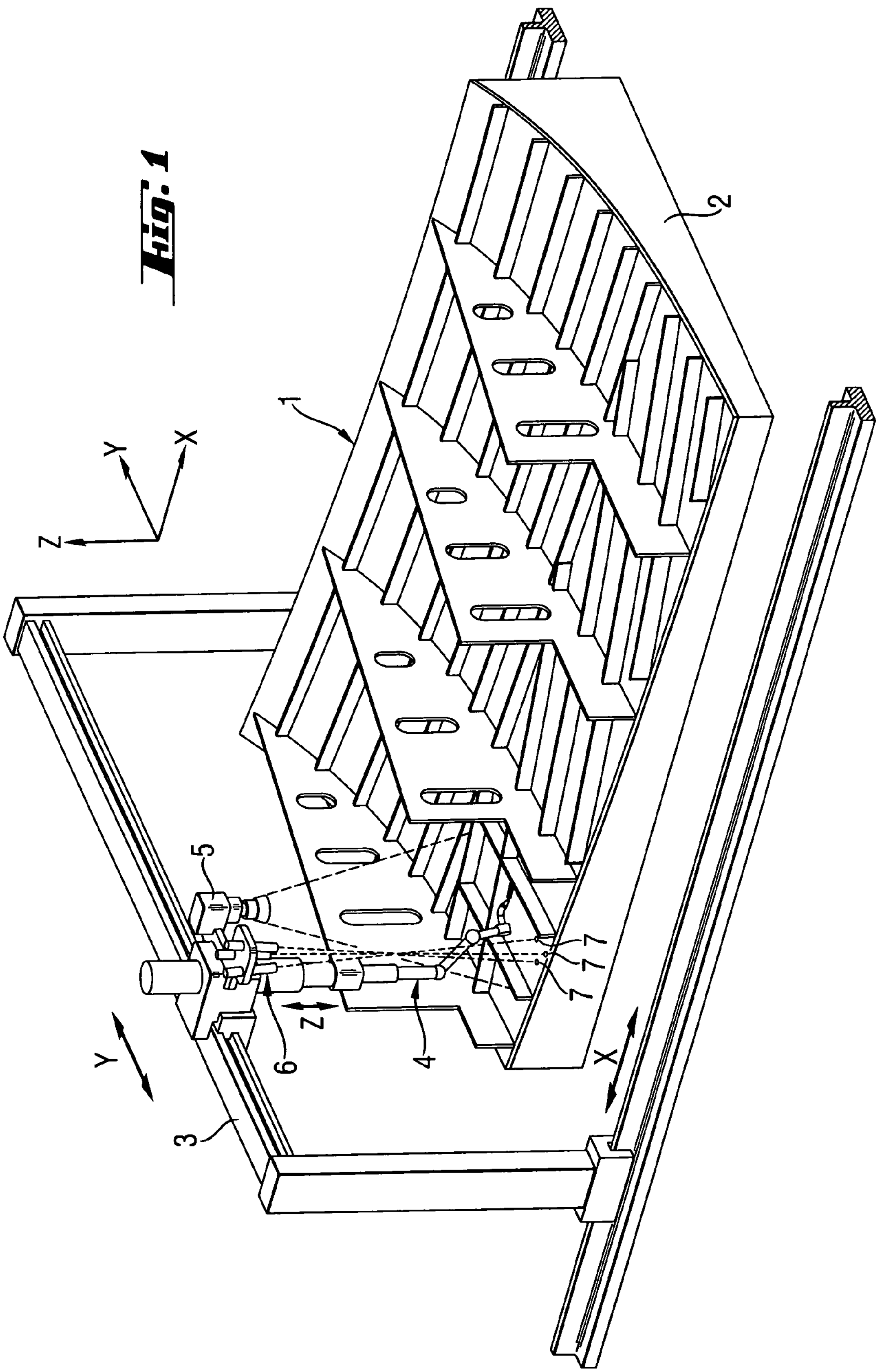
FIG. 1 depicts the principle of a robotized welding arrangement that implements a method embodying the invention.

In the figures the reference numeral 1 indicates a structure to be welded, which in this case is a shaped piece used in shipbuilding and has a plurality of both longitudinal and transverse support structures, an essential part of which can be welded by means of a controllable robot. The shaped piece is curved about one axis and it may be curved about two axes. The shaped piece 1 is placed on a support base 2, which is located within the working area of a robot portal 3. A welding robot 4 is located at the robot portal 3 and in addition, the system comprises a camera device 5. The welding robot 4 is movable in the Y-direction and in the Z-direction relative to the robot portal. The robot portal 3 is in practice arranged on a rail track and is thus movable in the X-direction with respect to the working area. There may, if required, be several robot portals on the same rail track and each portal may have one or more welding robots 4. The welding robots 4 are movable within the working area both in the X-Y-direction (horizontal) and in the Z-direction (vertical).

The camera device 5 may comprise one or several cameras, e.g. digital cameras, and they may be located in various ways, for instance at the portal itself, in conjunction with the welding equipment or apart from it, or in the structures surrounding the portal. Depending on the lighting conditions, the system may also include a number of lighting fixtures, e.g. halogen lamps (not shown), which are preferably provided with dimmers so that the prevailing lighting conditions may be kept as constant as possible in order to ensure a successful photographic outcome.

Figure 2:
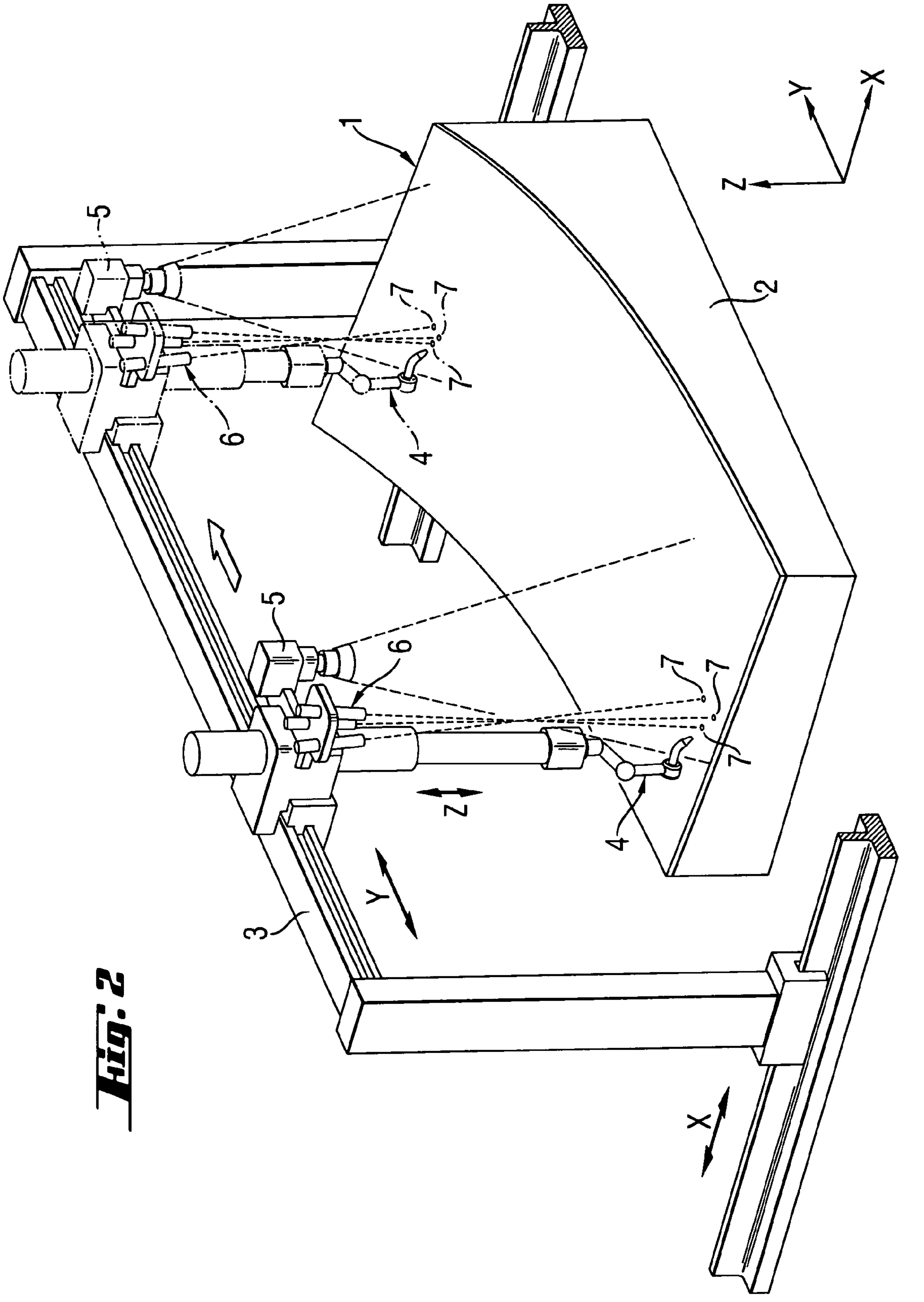
FIG. 2 illustrates the ranging system based on laser pointers employed in a method embodying the invention.

The illustrated welding arrangement includes a system for vertical ranging, which is illustrated in FIG. 2. The ranging is preferably based on three laser pointers 6, which are directed so that they intersect and their beams are incident on the surface of the shaped piece 1 at three points 7. Since the local level and posture or orientation of the surface change as the plate field curves, also the mutual distances between the points 7 change. The measuring points 7 are photographed continuously by the camera device 5, which may be arranged on the same carriage with the welding robot. The camera used for the ranging may, if required, be separate from the camera device used for general photographing of the structure 1. On the basis of the change of the mutual distance between the measuring points the current level of the surface to be welded is determined by calculation. The ranging system is used for controlling the welding robot in the vertical direction, i.e. in the direction of the Z-axis. Due to the level control in real time the curved surfaces may, from the viewpoint of the robot, appear planar, whereby two-dimensional control data and a robotized welding system developed for planar pieces may be applied to three-dimensional pieces.

The control data for the Z-axis are preferably calculated over a longer distance in order to avoid incorrect information produced by the intersecting structures. Thus, level information is calculated for several points that are spaced apart along the welding track shown in the 2D picture map and each level value is compared with other level values calculated for other points along the welding track. If one calculated value differs excessively from other values, that value is discarded as being erroneous and a substitute value is calculated by interpolation or extrapolation from the other values. The control along the Z-axis may be independent, whereby it operates in parallel with the control of the welding robot, or it may be integrated with the control of the welding robot, whereby it operates under the control of the welding robot.

The operational principle of the method according to the invention is basically as follows. A shaped piece, where the profile sections are attached to a curved sheet panel by tack welds, is positioned on a support base in the working area of the welding robot. The working area is photographed by the camera device 5 using appropriate lighting, where required, for facilitating the identification. The welding accomplished by the welding robot is based on pre-programmed macro programs, the input data of which consist of the formal data provided by the camera device. At its simplest a so-called skeleton image on the X-Y-plane is formed of the shaped piece, where specific welding points are identified and appropriate weld types with welding parameters are selected by reference thereto. An operator programs the welding robot. The welding robot may start the welding once the first weld has been determined. The control of the welding in the direction of the Z-axis is performed by real-time level (or height) monitoring as is described in the above, whereby the level control system keeps the welding robot at a constant distance from the surface to be welded.

Seam tracking may be utilized for correcting minor errors in the positioning of the robot's welding head. The seam tracking may be performed for instance so that the welding current varies according to the length of free wire, when welding with constant voltage (MIG/MAG) is concerned. In the seam tracking through the arc, when the seam is welded by using an oscillation mechanism, the welding current is equally strong for both faces at the same point, if the seam is symmetrical. When the distance of the welding head from the fusion face of the seam varies, the welding current is not equally strong, whereby these values are measured and the path is changed in the seam tracking in order to make the possibly deviating current values equal.

A substantial advantage with the method described above is the fact that the Z-coordinate information, which is lacking in the camera image at the programming stage, is determined by calculation.

The invention is not limited to the above-described embodiment, but several modifications are conceivable in the scope of the appended claims.

The invention claimed is:

1. A method of forming a welded structure composed of a three-dimensional support base and a plurality of pieces employing welding equipment that is operable in a three-dimensional X-Y-Z coordinate system, said method comprising:

arranging the pieces on the support base to provide an assembly in accordance with the structure to be welded, photographing the assembly and making a picture map of the assembly, identifying weld points and determining welding parameters from the picture map, supplying control data specifying said weld points and welding parameters to the welding equipment, moving the welding equipment in the X-Y plane on the basis of the picture map and said control data, repeatedly measuring the Z-axis position of the support base by laser pointing and supplying Z-axis position data to the welding equipment, and moving the welding equipment along the Z-axis on the basis of the Z-axis position data so as to maintain the welding equipment at a constant Z-axis distance from the support base.

2. A method according to claim 1, wherein the step of laser pointing includes directing three laser pointer beams towards the support base and the method includes analyzing the image of the support base to extract relative locations of the points of incidence of the laser pointer beams on the support base.

3. A method according to claim 2, comprising directing the three laser pointer beams so that they intersect.

4. A method according to claim 2, comprising calculating the Z-axis position of the support base from said relative locations.

5. A method according to claim 1, wherein the welding equipment includes a welding robot that is attached to a carriage for moving the welding robot in the X-Y plane, the method comprises employing a camera to acquire said image, and said camera is attached to the carriage.

6. A method according to claim 1, comprising moving the welding equipment along the Z-axis position in a manner such as to maintain a constant Z-axis distance between the welding equipment and the support base.

7. A method according to claim 1, comprising employing weld groove monitoring to correct errors in positioning of the welding equipment.

8. A method according to claim 7, wherein the weld groove monitoring includes monitoring through a welding arc.

9. A method according to claim 7, wherein the weld groove monitoring includes optical weld groove monitoring.

10. A method according to claim 1, comprising adjusting illumination of the assembly for photographing the assembly.

11. A method according to claim 1, wherein the welding equipment includes a control system, the method comprises supplying the Z-axis position data to the control system, and the control system controls movement of the welding equipment along the Z-axis.

12. A method of forming a welded structure to be used in a watercraft, comprising:

providing a three-dimensional support base, arranging a plurality of pieces on the support base to provide an assembly in accordance with the structure to be welded, photographing the assembly and making a picture map of the assembly, identifying weld points and determining welding parameters from the picture map, moving a welding robot in an X-Y plane on the basis of the picture map and control data specifying said weld points and welding parameters, repeatedly measuring the Z-axis position of the support base by laser pointing, and moving the welding robot along the Z-axis on the basis of the Z-axis position data to maintain the welding robot at a constant distance from the support base.

13. A method according to claim 12, wherein the welding robot addresses a welding location on the support base, the welding location moves about the support base as the welding robot moves in the X-Y plane, and the method comprises repeatedly measuring the Z-axis position of the welding location as the welding location moves about the support base and moving the welding robot along the Z-axis to maintain the welding robot at a constant distance from the welding location.

14. A method according to claim 12, comprising determining a welding track on the support base from the picture map, moving the welding robot in the X-Y plane so that the welding location addressed by the welding robot moves along the welding track, measuring the Z-axis position of the support base at a plurality of locations along the welding track, comparing measured values of the Z-axis positions at said locations respectively, and in the event that a measured value for a given location differs from the measured values for other locations by an amount that exceeds a threshold, calculating a substitute value for the Z-axis position at said given location.

15. A method according to claim 14, wherein the step of calculating a substitute value comprises interpolating or extrapolating from measured values for said other locations.

* * * * *